(12) United States Patent
Chen et al.

(10) Patent No.: US 11,341,659 B2
(45) Date of Patent: May 24, 2022

(54) CROSS-SENSOR OBJECT-SPACE CORRESPONDENCE ANALYSIS METHOD AND SYSTEM USING SAME

(71) Applicant: QNAP SYSTEMS, INC., New Taipei (TW)

(72) Inventors: Kung-Han Chen, New Taipei (TW);
Peng-Yan Sie, New Taipei (TW);
Jian-Kai Wang, New Taipei (TW);
Yun-Tao Chen, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 0 days.

(21) Appl. No.: 17/133,817

(22) Filed: Dec. 24, 2020

(65) Prior Publication Data

US 2022/0044425 A1  Feb. 10, 2022

(30) Foreign Application Priority Data

Aug. 10, 2020  (TW) .................................. 109127118

(51) Int. Cl.
*G06T 7/292* (2017.01)
*H04N 7/18* (2006.01)

(52) U.S. Cl.
CPC ............. *G06T 7/292* (2017.01); *H04N 7/181* (2013.01); *G06T 2207/10016* (2013.01); *G06T 2207/30196* (2013.01); *G06T 2207/30232* (2013.01)

(58) Field of Classification Search
None
See application file for complete search history.

(56) References Cited

U.S. PATENT DOCUMENTS

2004/0128102 A1* 7/2004 Petty ....................... G01S 17/46
702/150
2004/0151365 A1* 8/2004 An Chang .......... G01B 11/2518
382/154

FOREIGN PATENT DOCUMENTS

EP    EP-0205175 A2 * 12/1986

OTHER PUBLICATIONS

Toward natural multi-user interaction in advanced collaborative display environments. Rusnak et al. (Year: 2016).*

* cited by examiner

*Primary Examiner* — Delomia L Gilliard
(74) *Attorney, Agent, or Firm* — Guice Patents PLLC

(57) ABSTRACT

A cross-sensor object-space correspondence analysis method for detecting at least one object in a space by using cooperation of a plurality of image sensing devices, the method including: the image sensing devices sending raw data or grid code data of multiple frames of sensed images to a main information processing device to determine a corresponding projection point or a moving track of each of the at least one object on a reference plane corresponding to the space, where each of the image sensing devices has an image plane, and the raw data and each of the grid code data all correspond to a time record.

10 Claims, 4 Drawing Sheets

CROSS-SENSOR OBJECT-SPACE CORRESPONDENCE ANALYSIS METHOD AND SYSTEM USING SAME

BACKGROUND OF THE INVENTION

Field of the Invention

The present invention relates to a method for detecting the position of an object in a space, in particular to a method for locating an object in a space by using a cross-sensor cooperative detection scheme.

Description of the Related Art

In general buildings or stores, cameras are installed at the corners of the internal space, and multiple screens are set up in a monitoring room for a security guard to monitor the internal space of the building or the store, so that the security guard can respond to emergencies in the internal space in time.

However, general cameras installed in buildings or stores only display the captured images or the analysis results of the captured images on corresponding screens respectively, and do not have a collaborative processing function. Therefore, for the security guard responsible for monitoring the screens, it is not only difficult to stay focused for a long time when monitoring multiple screens at the same time, but also difficult to identify abnormal events or suspicious persons.

To solve the problems mentioned above, a novel space object detection scheme is urgently needed.

SUMMARY OF THE INVENTION

One objective of the present invention is to provide a cross-sensor object-space correspondence analysis method, which can efficiently locate each object in a space without the need of calculating the traditional three-dimensional space coordinates by configuring a plurality of grids on an image plane of each image sensing device, and assigning each of the grids with a code.

Another objective of the present invention is to provide a cross-sensor object-space correspondence analysis method, which can combine the appearance time points of an object with appearance grid codes on the image planes of the image sensing devices repeatedly to detect a trajectory of the object in a space efficiently.

Still another objective of the present invention is to provide a cross-sensor object-space correspondence analysis system, which can efficiently execute the object-space correspondence analysis method of the present invention by adopting an edge computing architecture.

To achieve the above objectives, a cross-sensor object-space correspondence analysis method is proposed for detecting at least one object in a space by using cooperation of a plurality of image sensing devices, the method being implemented by an edge computing architecture including a plurality of information processing units in the image sensing devices respectively and a main information processing device, and the method including:

the information processing units transmitting detected data to the main information processing device, the detected data being raw data of plural frames of image sensed by the image sensing devices, or at least one local grid code or at least one global grid code generated by using a first inference process to process the raw data, and the main information processing device using the detected data to determine a projection point on a reference plane corresponding to the space for each of the at least one object, where each of the image sensing devices has an image plane, the raw data, each of the at least one local grid code, and each of the at least one global grid code all correspond to a time record, the first inference process includes: performing a target locating procedure on the raw data to locate at least one pixel position in a frame of the image corresponding to at least one of the at least one object at a time point; and using a first grid code look-up table to perform a first mapping operation on each of the at least one pixel position to generate the at least one local grid code corresponding to at least one of the grids of one of the image planes, or using a second grid code look-up table to perform a second mapping operation on each of the at least one pixel position to generate the at least one global grid code corresponding to at least one of the grids of the reference plane; and the main information processing device performing a second inference procedure on the raw data of the frames of image provided by the information processing units to generate at least one of the at least one global grid code, and using the global grid code to represent the projection point; or using a code-code look-up table to perform a third mapping operation on the at least one local grid code provided by each of the information processing units to obtain at least one of the global grid codes to represent the projection point of the at least one object on the reference plane; or using the global grid code provided by the information processing units to represent the projection point, where the second inference procedure includes: performing an object positioning procedure on the raw data to locate at least one pixel position in a frame of the image corresponding to at least one of the at least one object; and using a second grid code look-up table to perform the second mapping operation on each of the at least one pixel position to generate at least one of the global grid codes corresponding to at least one of the grids of the reference plane.

In one embodiment, the information processing units have at least one hardware acceleration unit.

In one embodiment, the object locating procedure includes using an AI module to perform an object recognition procedure on the raw data to identify at least one of the at least one object.

In one embodiment, each of the grids is a polygon.

In one embodiment, the code-code look-up table is determined according to a depression angle of each of the image sensing devices.

In possible embodiments, the local grid codes of the first grid code look-up tables corresponding to any two of the image sensing devices may be configured to be same or different from each other.

In possible embodiments, the code-code look-up tables corresponding to any two of the image sensing devices may be configured to be same or different from each other.

In one embodiment, the main information processing device further combines appearance time points of one of the at least one object with located ones of the local grid codes or the global grid codes on the image planes of the image sensing devices to detect a motion track in the space.

To achieve the above objective, the present invention further proposes a cross-sensor object-space correspondence analysis system, which has the edge computing architecture mentioned above to realize the cross-sensor object-space correspondence analysis method.

In possible embodiments, the main information processing device may be a cloud server or a local server or a computer device.

In possible embodiments, the image sensing devices can communicate with the main information processing device in a wired or wireless manner.

DETAILED DESCRIPTION OF THE PREFERRED EMBODIMENTS

To make it easier for our examiner to understand the objective of the invention, its structure, innovative features, and performance, we use preferred embodiments together with the accompanying drawings for the detailed description of the invention.

The principle of the present invention lies in:

(1) Divide a reference plane representing a space into a plurality of first grids each having a polygonal shape, and assign a global code to each of the first grids to represent respective positions of the first grids, the global codes being mapped onto the first grids with a predetermined sequence, and the present invention can therefore quickly reflect the position of an object in the space without the need of calculating the position coordinates (x, y) on the reference plane;

(2) Install a plurality of image sensing devices in the space, divide each of the image planes of the image sensing devices into a plurality of second grids each having a polygonal shape, and assign a local code or a global code to each of the second grids in a predetermined sequence to represent locations of the second grids, where when the second grids of an image plane are represented by the local codes, the local codes have to be further mapped onto the global codes on the reference plane according to a look-up table, and when the second grids of an image plane are represented by the global codes, the second grids on the image plane can directly reflect locations via the global codes; and (3) Let the information transmitted from the image sensing devices to a main information processing device include a time record and at least one local code (or at least one global code), so that the main information processing device can perform a cross-sensor object-space correspondence analysis method to quickly locate and/or track the objects in the space.

Figure 1:
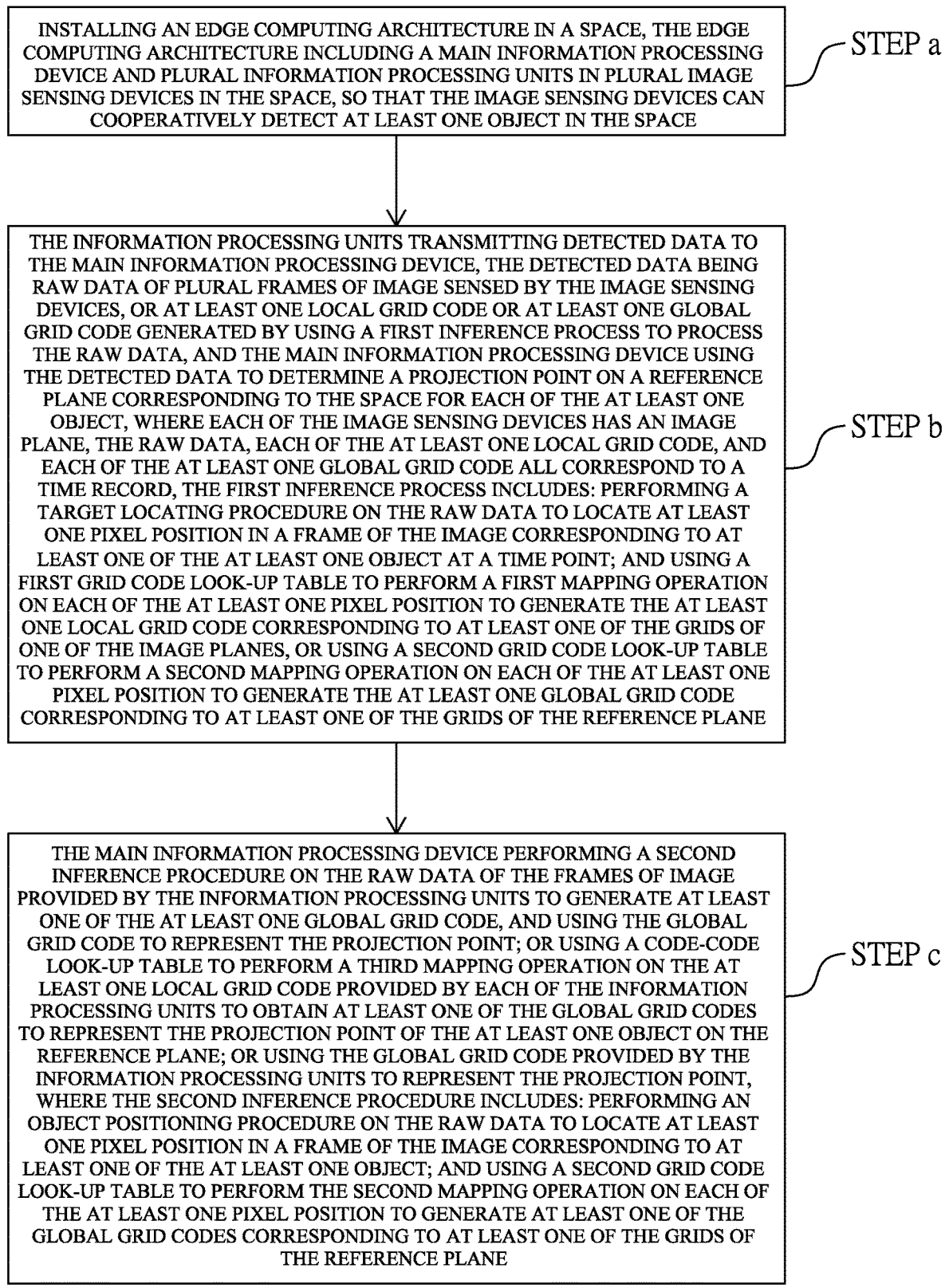
FIG. 1 illustrates a flowchart of an embodiment of the cross-sensor object-space correspondence analysis method of the present invention.
Figure 2:
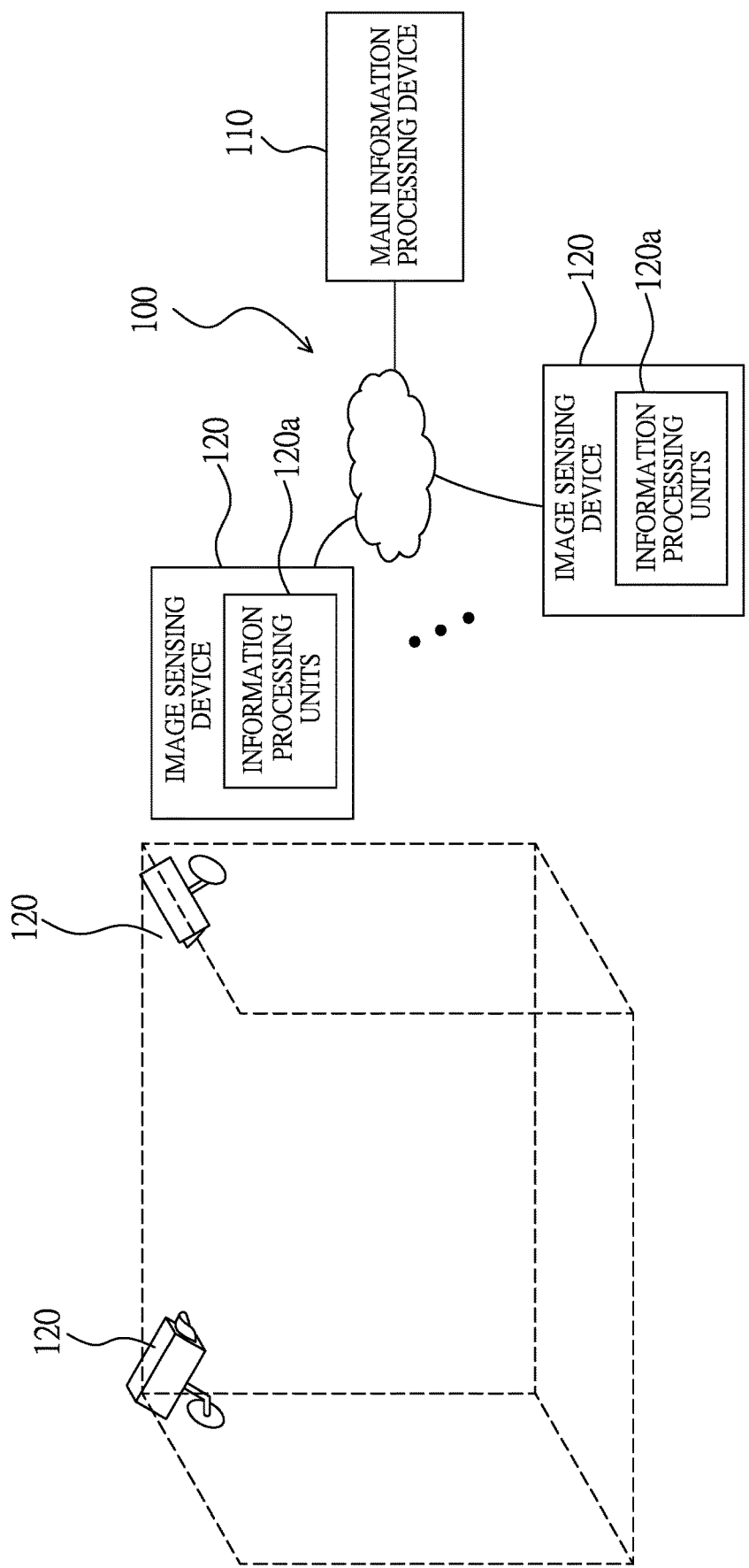
FIG. 2 illustrates a system using the method of FIG. 1, where the system has an edge computing architecture, and the edge computing architecture includes a main information processing device and plural image sensing devices disposed in plural image sensing devices to make the plural image sensing devices to cooperatively detect at least one object in a space.
Figure 3:
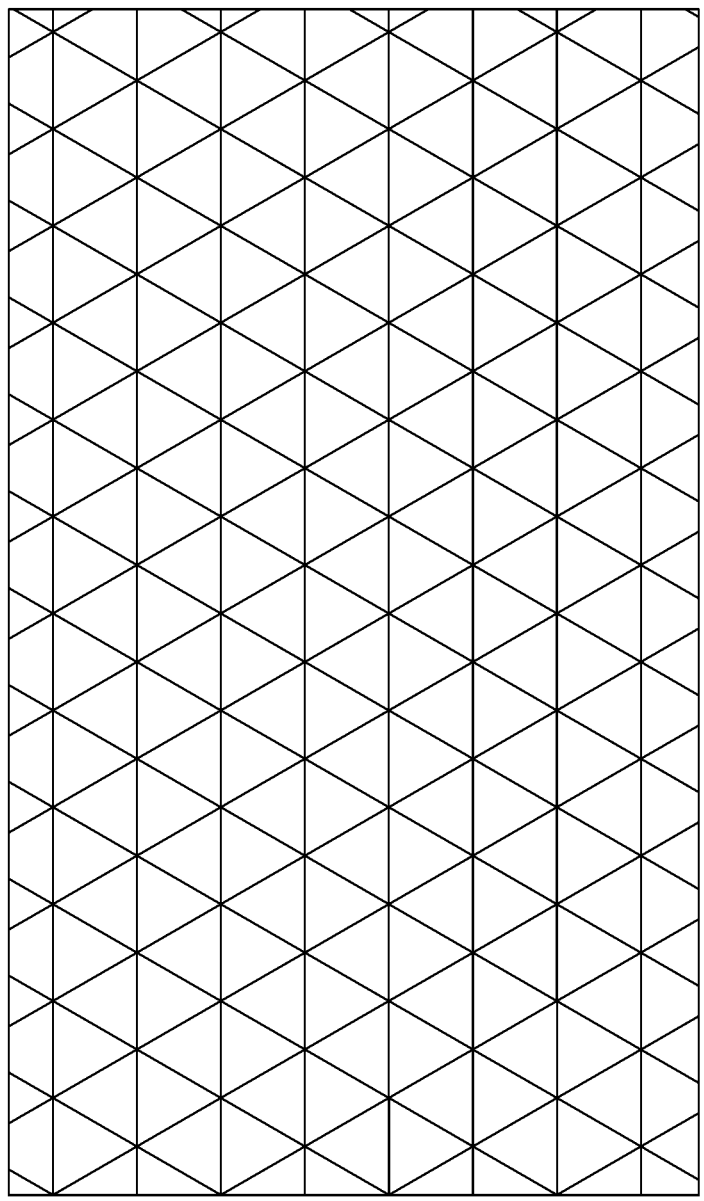
FIG. 3 illustrates an embodiment that a reference plane representing the space shown in FIG. 2 is divided into a plurality of first grids each having a polygonal shape.
Figure 4:
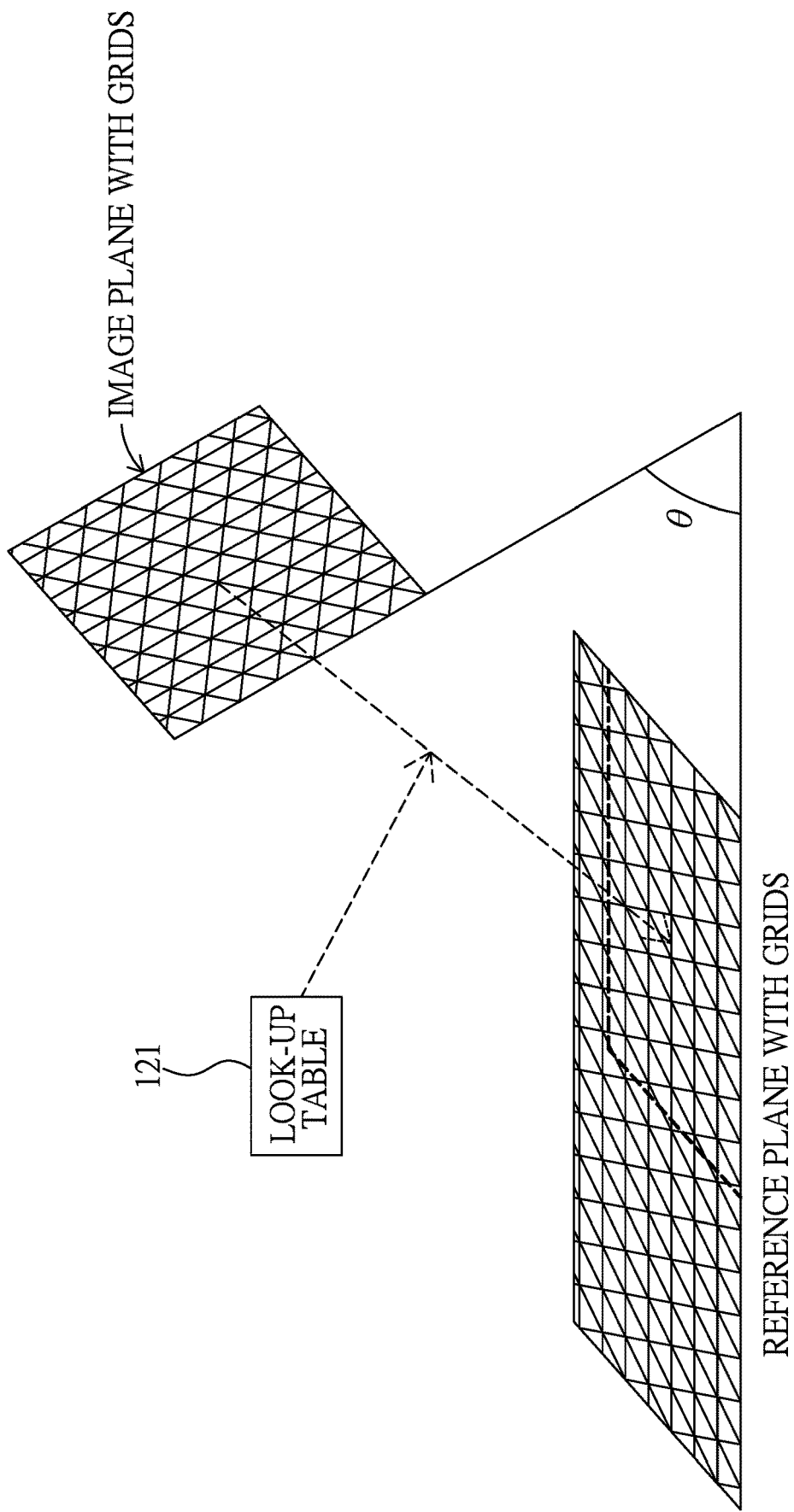
FIG. 4 illustrates that the local codes of a plurality of second grids of the image plane of an image sensing device shown in FIG. 2 are mapped onto a plurality of global codes on the reference plane according to a look-up table, where the look-up table is determined by a depression angle of the image sensing device.

Please refer to FIGS. 1-4, where FIG. 1 illustrates a flowchart of an embodiment of the cross-sensor object-space correspondence analysis method of the present invention;

FIG. 2 illustrates a system using the method of FIG. 1, where the system has an edge computing architecture, and the edge computing architecture includes a main information processing device and plural image sensing devices disposed in plural image sensing devices to make the plural image sensing devices to cooperatively detect at least one object in a space; FIG. 3 illustrates a scenario that a reference plane representing the space shown in FIG. 2 is divided into a plurality of first grids each having a polygonal shape; and FIG. 4 illustrates that the local codes of a plurality of second grids of the image plane of an image sensing device shown in FIG. 2 are mapped onto a plurality of global codes on the reference plane according to a look-up table, where the look-up table is determined by a depression angle of the image sensing device.

As shown in FIG. 1, the method includes the following steps: installing an edge computing architecture in a space, the edge computing architecture including a main information processing device and plural information processing units in plural image sensing devices in the space, so that the image sensing devices can cooperatively detect at least one object in the space (step a); the information processing units transmitting detected data to the main information processing device, the detected data being raw data of plural frames of image sensed by the image sensing devices, or at least one local grid code or at least one global grid code generated by using a first inference process to process the raw data, and the main information processing device using the detected data to determine a projection point on a reference plane corresponding to the space for each of the at least one object, where each of the image sensing devices has an image plane, the raw data, each of the at least one local grid code, and each of the at least one global grid code all correspond to a time record, the first inference process includes: performing a target locating procedure on the raw data to locate at least one pixel position in a frame of the image corresponding to at least one of the at least one object at a time point; and using a first grid code look-up table to perform a first mapping operation on each of the at least one pixel position to generate the at least one local grid code corresponding to at least one of the grids of one of the image planes, or using a second grid code look-up table to perform a second mapping operation on each of the at least one pixel position to generate the at least one global grid code corresponding to at least one of the grids of the reference plane (step b); and the main information processing device performing a second inference procedure on the raw data of the frames of image provided by the information processing units to generate at least one of the at least one global grid code, and using the global grid code to represent the projection point; or using a code-code look-up table to perform a third mapping operation on the at least one local grid code provided by each of the information processing units to obtain at least one of the global grid codes to represent the projection point of the at least one object on the reference plane; or using the global grid code provided by the information processing units to represent the projection point, where the second inference procedure includes: performing an object positioning procedure on the raw data to locate at least one pixel position in a frame of the image corresponding to at least one of the at least one object; and using a second grid code look-up table to perform the second mapping operation on each of the at least one pixel position to generate at least one of the global grid codes corresponding to at least one of the grids of the reference plane (step c).

In step a, the information processing units may have at least one hardware acceleration unit.

In step b, the object positioning procedure includes using an AI module to perform an object recognition procedure on the raw data to identify at least one object, and the grids are each a polygon, for example but not limited to triangle, quadrilateral, or hexagon, etc.

In step c, the code-code look-up table is determined according to the depression angle of each of the image sensing devices.

In addition, the local grid codes of the first grid code look-up tables corresponding to any two of the image sensing devices may be configured to be same or different from each other. For example, the local grid codes of one of the first grid code look-up tables can be Arabic numerals, and the local grid codes of another one of the first grid code look-up tables can be Arabic numerals or English letters.

In addition, the code-code look-up tables corresponding to any two of the image sensing devices may be configured to be same or different from each other.

In addition, in light of the above description, the present invention can also combine the appearance time points of an object in a space with corresponding grid codes located on the image planes of the image sensing devices to efficiently detect a trajectory of the object in the space.

As shown in FIG. 2, the system of the present invention has an edge computing architecture 100, which includes a main information processing device 110 and a plurality of image sensing devices 120 arranged in a space, where the main information processing device 110 can be a cloud server or a local server or a computer device. Each image sensing device 120 has an information processing unit 120a, and each information processing unit 120a communicates with the main information processing device 110 via a wired or wireless network, so as to perform the aforementioned method to make the image sensing devices cooperatively detect at least one object.

That is, when in operation, the edge computing architecture 100 will execute the following steps:

(1) The information processing units 120a transmit detected data to the main information processing device 110, the detected data being raw data of plural frames of image sensed by the image sensing devices 120, or at least one local grid code or at least one global grid code generated by using a first inference process to process the raw data, and the main information processing device 110 uses the detected data to determine a projection point on a reference plane corresponding to the space for each of the at least one object. Please refer to FIG. 3, which illustrates an embodiment that a reference plane representing the space shown in FIG. 2 is divided into a plurality of first grids each having a polygonal shape. In addition, each of the image sensing devices 120 has an image plane, and the raw data, each of the at least one local grid code, and each of the at least one global grid code all correspond to a time record. The first inference process includes: performing a target locating procedure on the raw data to locate at least one pixel position in a frame of the image corresponding to at least one of the at least one object at a time point; and using a first grid code look-up table to perform a first mapping operation on each of the at least one pixel position to generate the at least one local grid code corresponding to at least one of the grids of one of the image planes, or using a second grid code look-up table to perform a second mapping operation on each of the at least one pixel position to generate the at least one global grid code corresponding to at least one of the grids of the reference plane. Please refer to FIG. 4, which illustrates that the local codes of a plurality of second grids of the image plane of an image sensing device 120 shown in FIG. 2 are mapped onto a plurality of global codes on the reference plane according to a look-up table 121, where the look-up table 121 is determined by a depression angle $\theta$ of the image sensing device 120.

(2) The main information processing device 110 performs a second inference procedure on the raw data of the frames of image provided by the information processing units 120a to generate at least one of the at least one global grid code, and using the global grid code to represent the projection point; or uses a code-code look-up table to perform a third mapping operation on the at least one local grid code provided by each of the information processing units 120a to obtain at least one of the global grid codes to represent the projection point of the at least one object on the reference plane; or uses the global grid code provided by the information processing units 120a to represent the projection point, where the second inference procedure includes: performing an object positioning procedure on the raw data to locate at least one pixel position in a frame of the image corresponding to at least one of the at least one object; and using a second grid code look-up table to perform the second mapping operation on each of the at least one pixel position to generate at least one of the global grid codes corresponding to at least one of the grids of the reference plane.

(3) The main information processing device 110 combines the appearance time points of an object in a space with corresponding grid codes located on the image planes of the image sensing devices 120 to efficiently detect a trajectory of the object.

As can be seen from the disclosure above, the present invention has the following advantages:

(1) The cross-sensor object-space correspondence analysis method of the present invention can efficiently locate each object in a space without the need of calculating the traditional three-dimensional space coordinates by configuring a plurality of grids on an image plane of each image sensing device, and assigning each of the grids with a code.

(2) The cross-sensor object-space correspondence analysis method of the present invention can combine the appearance time points of an object in a space with corresponding grid codes located on the image planes of the image sensing devices to efficiently detect a trajectory of the object in the space.

(3) The cross-sensor object-space correspondence analysis system of the present invention can efficiently execute the object-space correspondence analysis method of the present invention by adopting an edge computing architecture.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A cross-sensor object-space correspondence analysis method for detecting at least one object in a space by using cooperation of a plurality of image sensing devices, the method being implemented by an edge computing architecture including a plurality of information processing units in the image sensing devices respectively and a main information processing device, and the method including:

the information processing units transmitting detected data to the main information processing device, the detected data being raw data of plural frames of image sensed by the image sensing devices, or at least one local grid code or at least one global grid code generated by using a first inference process to process the raw data, and the main information processing device using the detected data to determine a projection point on a reference plane corresponding to the space for each of the at least one object, where each of the image sensing devices has an image plane, the raw data, each of the at least one local grid code, and each of the at least one global grid code all correspond to a time record, the first inference process includes: performing a target locating procedure on the raw data to locate at least one pixel position in a frame of the image corresponding to at least one of the at least one object at a time point; and using a first grid code look-up table to perform a first mapping operation on each of the at least one pixel position to generate the at least one local grid code corresponding to at least one grid of a plurality of grids of a corresponding one of the plurality of image sensing devices, or using a second grid code look-up table to perform a second mapping operation on each of the at least one pixel position to generate the at least one global grid code corresponding to at least one grid of a plurality of grids of the reference plane; and the main information processing device performing a second inference procedure on the raw data of the frames of image provided by the information processing units to generate at least one of the at least one global grid code, and using the global grid code to represent the projection point; or using a code-code look-up table to perform a third mapping operation on the at least one local grid code provided by each of the information processing units to obtain at least one of the global grid codes to represent the projection point of the at least one object on the reference plane; or using the global grid code provided by the information processing units to represent the projection point, where the second inference procedure includes:

performing an object positioning procedure on the raw data to locate at least one pixel position in a frame of the image corresponding to at least one of the at least one object;

and using a second grid code look-up table to perform the second mapping operation on each of the at least one pixel position to generate at least one of the global grid codes corresponding to at least one of the grids of the reference plane.

2. The cross-sensor object-space correspondence analysis method as disclosed in claim 1, wherein the information processing units have at least one hardware acceleration unit.

3. The cross-sensor object-space correspondence analysis method as disclosed in claim 1, wherein the object locating procedure includes using an AI module to perform an object recognition procedure on the raw data to identify at least one of the at least one object.

4. The cross-sensor object-space correspondence analysis method as disclosed in claim 1, wherein each said grid of the plurality of grids of the plurality of image sensing devices and the plurality of grids of the reference plane is a polygon.

5. The cross-sensor object-space correspondence analysis method as disclosed in claim 1, wherein the code-code look-up table is determined according to a depression angle of each of the image sensing devices.

6. The cross-sensor object-space correspondence analysis method as disclosed in claim 1, wherein the local grid codes of the first grid code look-up tables corresponding to any two of the image sensing devices are configured to be same or different from each other.

7. The cross-sensor object-space correspondence analysis method as disclosed in claim 1, wherein the code-code look-up tables corresponding to any two of the image sensing devices are configured to be same or different from each other.

8. The cross-sensor object-space correspondence analysis method as disclosed in claim 1, wherein the main information processing device further combines appearance time points of one of the at least one object with located ones of the local grid codes or the global grid codes on the image planes of the image sensing devices to detect a motion track in the space.

9. A cross-sensor object-space correspondence analysis system having the edge computing architecture as disclosed in claim 1 to realize the cross-sensor object-space correspondence analysis method as disclosed in claim 1, wherein the main information processing device is selected from a group consisting of a cloud server, a local server, and a computer device.

10. The cross-sensor object-space correspondence analysis system as disclosed in claim 9, wherein the image sensing devices communicate with the main information processing device in a wired or wireless manner.

\* \* \* \* \*